United States Patent [19]
Gronnevik

[11] Patent Number: 4,896,790
[45] Date of Patent: Jan. 30, 1990

[54] THERMAL BOX FOR THE TRANSPORTATION OF FRESH GOODS AND A METHOD OF PRODUCING A MOULDING THEREFOR

[75] Inventor: Oddbjørn Grønnevik, Nesbru, Norway

[73] Assignee: Norsk Hydro A.S., Oslo, Norway

[21] Appl. No.: 213,619

[22] Filed: Jun. 30, 1988

[30] Foreign Application Priority Data

Jun. 30, 1987 [NO] Norway ................................ 872726

[51] Int. Cl.⁴ ............................................... B65D 5/00
[52] U.S. Cl. ................................... 220/416; 220/469; 426/109; 426/129
[58] Field of Search .................... 220/83, 416, 469; 426/109, 112, 124, 129

[56] References Cited

U.S. PATENT DOCUMENTS

| | | | |
|---|---|---|---|
| 3,155,303 | 11/1964 | Fenkel | 426/124 X |
| 3,264,120 | 8/1966 | Westcott | 426/124 |
| 3,602,422 | 8/1971 | Dewhurst | 426/124 |
| 3,756,681 | 9/1973 | Croston | 426/129 X |

FOREIGN PATENT DOCUMENTS 2226970 12/1973 Fed. Rep. of Germany.

*Primary Examiner*—Gerald A. Michalsky
*Attorney, Agent, or Firm*—Wenderoth, Lind & Ponack

[57] ABSTRACT

A thermo box (1) for the transportation of fresh goods, such as meat, fish, medicines or the like, consists of a double sidewall, cover and bottom construction of a thermoplastic material. A hollow space (7, 8, 9) in the base portion defining the bottom of the box, sidewalls and the cover is filled with air or some other gas. The basic shape of the box is a generally flat hollow moulding (2), wherein the side walls (4) are folded upwardly along weakening lines (5) and joined at their corners. An inner sheet (19) of the base portion of the box has drainage channels (24) and through holes (25) permitting ice and drainage water exuded from the moist goods to flow into the hollow space (9) in the bottom of the box, where it is trapped. The hollow moulding (2) is produced via blast moulding, wherein plastic material is extruded through a ring shaped nozzle (10) to form a hose (11), which is then inflated and shaped between two dies (15, 16).

20 Claims, 4 Drawing Sheets

THERMAL BOX FOR THE TRANSPORTATION OF FRESH GOODS AND A METHOD OF PRODUCING A MOULDING THEREFOR

BACKGROUND OF THE INVENTION

The present invention relates to a thermo box for transporting fresh goods such as fresh fish and meat, medicines etc. comprising a double sidewall, top and bottom construction of thermoplastic material, where the hollow space of a base portion, defining the bottom of the box, the sidewalls and the cover is filled with air or some other gas. A drainage for liquid such as icewater and/or juices from the goods is provided in conjunction with the base portion. The invention also comprises a method for producing a flat hollow moulding from which the box is shaped.

Particularly within the biomarine field, there has been an increase in the transportation of fish and shellfish as fresh food to consumers. Fish or shellfish are covered with ice and transported in insulated boxes, so called thermo boxes, to destinations at home or abroad.

The most ordinary boxes used for such transport today are made of foam plastic, for instance polystyrene. Although the thermal insulation ability for such boxes is good, the quality of the boxes in other aspects is poor. The constructional properties are poor; the boxes often break when stocked or carried, and as a consequence damage the contents, resulting in economic losses.

Foam plastic boxes also have the disadvantage of having through holes in the bottom at the sides, in order to drain liquids such as melted ice and blood exuding from the fish, and are as such essential. These holes, however, do not solve the undesirable problem of polluting the boxes' environments, such as stock and transport rooms. In airtransport it is highly preferable that goods be packed in waterproof containers. This requires that the base portion be provided with an additional material having a high absorption capacity. The extra packing increases the transportation costs, because the transportation capacity is reduced (due to the augmented volume) and repacking of the foam plastic containers is necessary.

In addition, the holes in the foam plastic containers contribute to a reduction of the insulation ability as air intrudes through the holes and circulates in the containers.

According to requirements of various national authorities, packing containers provided for the transportation of fresh food such as fish and meat can be used only once. An essential part of the disposable packing used for such transport will promptly be destroyed. Foam plastic containers represent a special environmental problem, as toxic dioxide is produced during combustion. For the recipient of the delivered goods, there is the problem of getting rid of the waste packing. It also ought to be mentioned that users of the foam plastic boxes are charged additionally for the transport of empty packing, as boxes of this type are quite voluminous.

Besides the above-mentioned foam plastic boxes which today are in practical use, another thermoplastic box is disclosed in German publication No. 2 226 970, but is presumably not commercially applied. The thermo box according to the German publication includes an inflatable, doublewall foil construction of a synthetic substance, for instance polyamid polyethylene, a base part having a perforated sheet allowing drainage of waste water. In an attempt to solve the stocking problem, the boxes are filled with a gaseous medium. It is quite apparent that the boxes will not be very useful when stacked. If one of the lowest boxes of a stack is punctured, which is not unlikely as trucks often are used, the whole stack will collapse. The drainage sheet in the base part of the box might fulfill its purpose as long as the box is not moved. But once the box is moved or is put in an oblique position, an undesirable flow of drainage of liquids may touch and contaminate the food.

SUMMARY OF THE INVENTION

The present invention solves the above-mentioned problems by providing a thermo box for the transportation of fresh food, particularly fish and meat, which is not encumbered with the above disadvantages, i.e. the thermo box according to the present invention:
  has insulating properties equivalent to the foam plastic boxes,
  has improved constructional properties,
  is cheap to produce,
  reduces transportation costs by avoiding repacking when sent by air,
  traps the drainage water without touching the goods,
  reduces the transportation costs of empty-packing, and
  reduces disposal problems by regranulating used boxes
    and using them in reproduction of new thermo boxes.

These and other advantages are achieved by the present invention by having a thermo box basically defined by a flat hollow moulding that includes a rectangular base portion defining a bottom of the box and side portions and a top portion which are integrally joined with and extend upwardly from the base portion, one from each of its extremities. The side portions are folded upwardly along weakening lines and joined at the corners by means of welding.

The invention also comprises an advantageous method for production of a hollow moulding and advantageous constructional features of the box itself.

BRIEF DESCRIPTION OF THE DRAWINGS

The invention will be further described herein below with reference to a preferred embodiment illustrated in the accompanying drawings, in which.

DESCRIPTION OF THE PREFERRED EMBODIMENT

Figure 1:
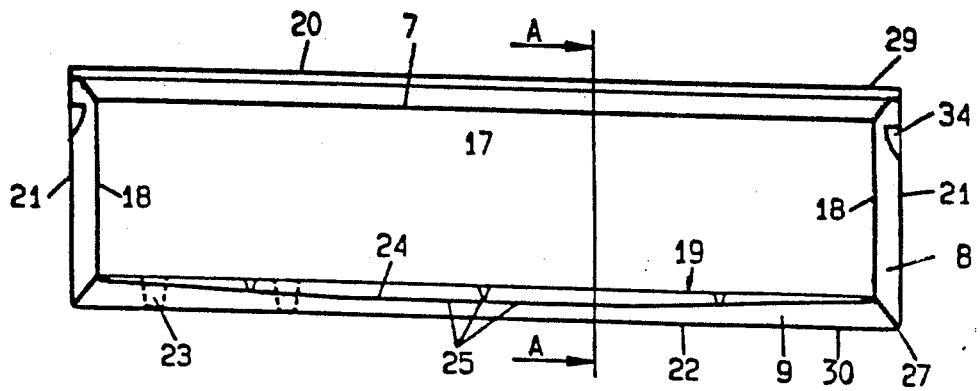
FIG. 1 is a longitudinal elevational sectional view of a
    thermo box according to the present invention.
Figure 2:
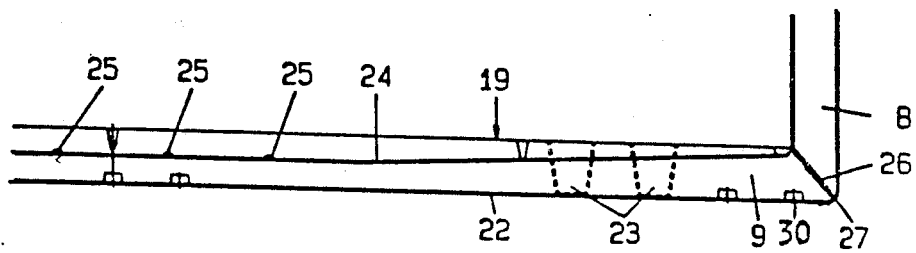
FIG. 2 shows an enlarged portion of the thermo box
    according to the present invention.
Figure 3:
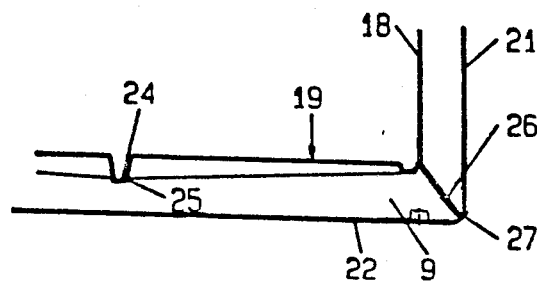
FIG. 3 is an enlarged fragmentary cross sectional view of
    the thermo box along line A—A of FIG. 1.

According to the present invention, a thermo box consists of a hollow double walled construction, including inner sidewalls/sheets 17, 18, 19 and outer sidewalls/sheets 20, 21, 22 shown in FIGS. 1-3.

The thermo box is produced of HDPE (High Density Poly Ethylene) or a similar thermoplastic material. The inner and outer sheets are kept separate by means of spacer sleeves 23, formed during the production of a hollow moulding 2, (see FIG. 4). The spacer sleeves improve the general construction of the thermo box in its sturdiness and mechanical strength. The number of spacer sleeves depends on the dimensions of the inner and outer sheets, the material utilized and the load (for instance when stored).

Figure 4:
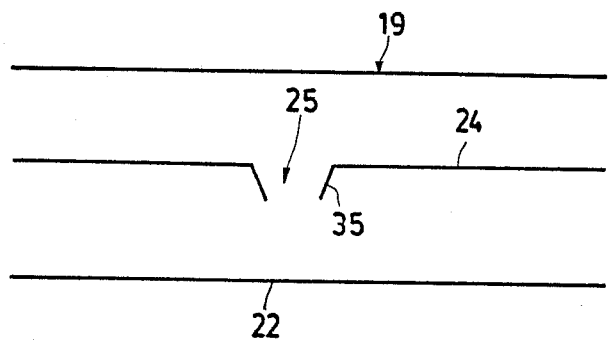
FIG. 4 is an enlarged fragmentary cross sectional view of
    a drainage feature according to the present invention.

The inner base sheet 19 includes drainage channels 24. In the example illustrated in FIGS. 1-6 the drainage channels run lengthwise. However, the drainage channels can equally run crosswise or be in the form of a star, i.e. all channels leading towards the center of the box. Furthermore, in the bottom of the channels 24, near the center of the box, are holes 25. Drainage fluid, like icewater and blood exuded from moist goods and flowing down to the base portion, are conducted via the channels 24 through the drainage holes 25 and into a hollow space 9 of the double wall base of the box, where the fluid is trapped. Drainage holes 25 may have inwardly extending flanges 35, as shown in FIG. 4. Further, connection holes 26 or the like are provided between the hollow space 9 in the base portion and a hollow space 8 in the sidewalls, permitting drainage fluid in the hollow space 9 in the base portion to flow to a hollow space 8 in a sidewall at the lowest level when the box is titled. This arrangement minimizes the pollution problem and inhibits drainage water from coming into contact with the goods. However, it is possible to add/or inject an antiseptic in the hollow space 9 to reduce or prevent bacterial growth in the exuded liquids. According to the present invention the thermo box displays essential advantages concerning drainage and trapping of fluids compared to previously known thermo boxes.

Among other distinctive features of the present invention, nipples or knobs 29 are arranged on the top of the cover and recesses 30 on the bottom of the base portion. The knobs 29 fit into the recess 30 permitting a box to be nestably stacked with other similar boxes. According to the present invention, the thermo box is also provided with recesses or hollows 34, which may serve as handles at each extremity.

The aforesaid defines the constructional features of the thermo box. The following will disclose the production of the thermo box.

Figure 6:
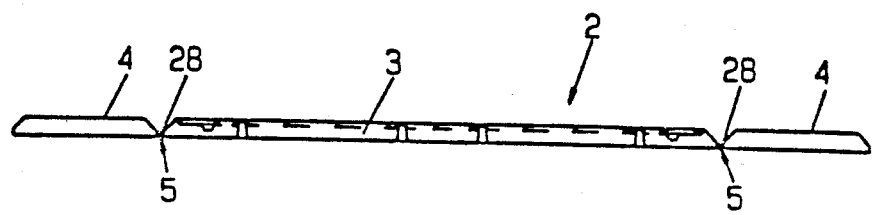
FIG. 6 is a longitudinal cross sectional view of the hollow moulding along line B—B of FIG. 5.
Figure 5:
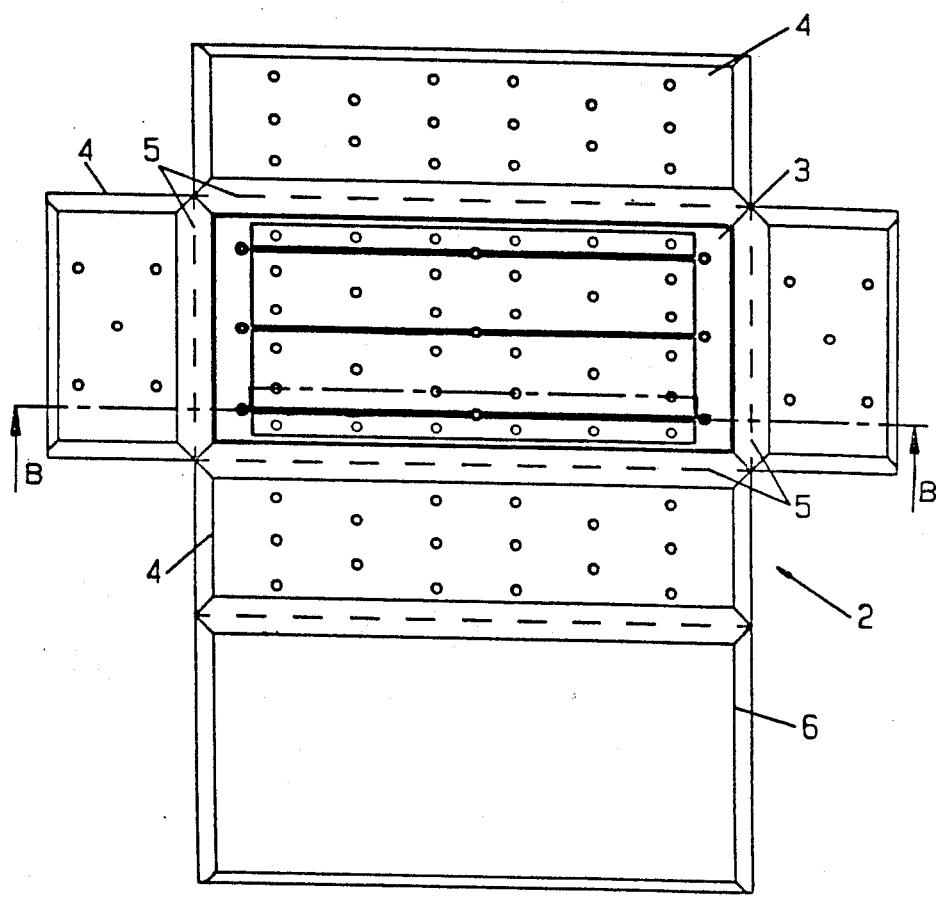
FIG. 5 is a perspective view of a hollow moulding according to the present invention.

Referring to FIGS. 5 and 6, the shape of the thermo box is based on a flat hollow moulding 2. The hollow moulding 2 comprises a rectangular base portion 3 defining the bottom of the box, and side portions 4 and a cover portion 6 having a hollow space 7 (FIG. 1) connected to and extending outwardly from the base portion 3, and from each of its extremities. In FIG. 5 the cover is integrally joined to the hollow moulding 2. However, the cover 6 may also be made of a separate hollow moulding.

The box is shaped by upwardly folding the side portions along weakening lines 5 and thereafter joining the side portions by welding at the corners of the thermo box. The weakening lines 5 are formed by the fact that the hollow moulding, on the side which comprises the inner sheet of the box, is provided with V-shaped grooves or notches 28, which after being folded, i.e. after the shaping of the box, appear as ribs 27 protruding into the hollow space 8 and 9.

The shaping of the box can be accomplished in a fully automatic operation by means of suitable equipment, not described here.

The equipment used for shaping the box can advantageously be situated at the point of use of the box. An essential reduction of transportation costs of the packing is thereby obtained, as the boxes can be transported as flat hollow mouldings instead of finished boxes, which are more voluminous, as noted above regarding the foam plastic boxes.

Figure 7:
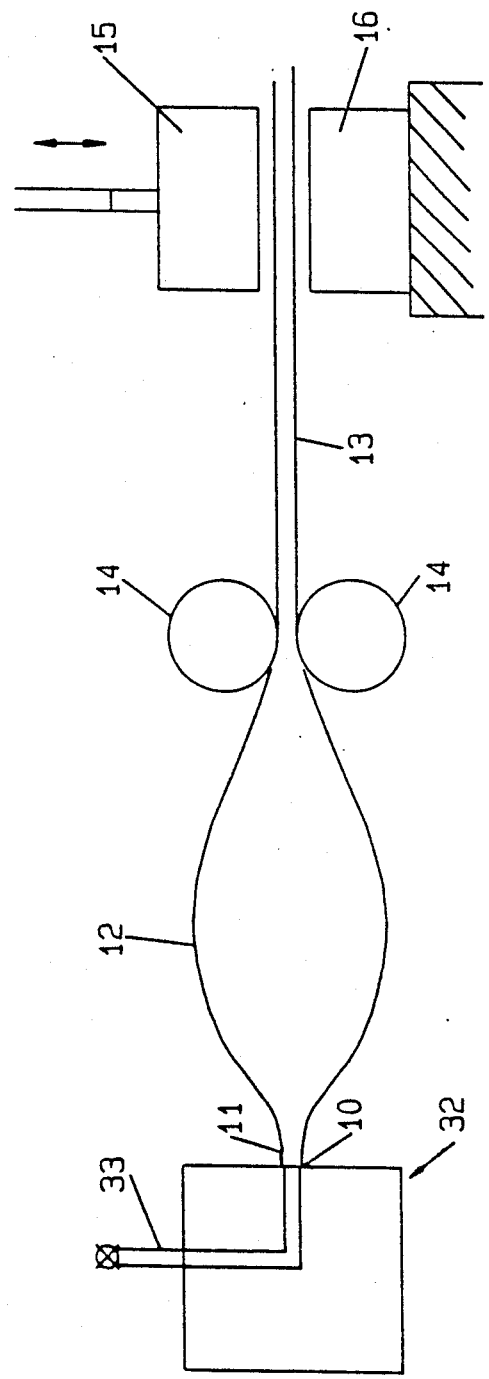
FIG. 7 shows schematically a method of producing the hollow moulding according to the present invention.

FIG. 7 shows schematically the principal method of producing the hollow moulding.

Roughly, the production equipment consists of an extrusion arrangement 32, supply lines for compressed air 33, rolls 14, and dies 15, 16. Plastic pulp, of which the hollow moulding is made, is extruded through a ring shaped nozzle 10 in the extruding unit 32. The hose 11 obtained is immediately inflated to a larger dimension 12 by means of compressed air supplied through the nozzle via the pipes 33.

The inflated hose 12 is further transported between the rolls 14 and are partially pressed to a flattened "hose" 13. The flattened hose 13 is subsequently transported between the dies 15, 16 and is pressed therebetween, whereby the final shape of the hollow moulding 2 is formed. The dies 15, 16 are supplied with cooling, welding and cutting equipment (not shown).

During the process of forming the hollow moulding 2, the upper and lower walls of the flattened hose 13, due to the inner pressure, are respectively pressed against shaped walls of the upper and the lower formed portions of the dies 15, 16, respectively. At the same time, the rims or lips surrounding the hollow moulding 2 are welded, and outwardly extending material is cut off. The hollow moulding 2 is thus produced in one operation without any need for further treatment.

I claim:

1. A moulding for forming a thermo box, said moulding comprising:
   a unitary, doubled-walled, hollow thermoplastic body, said body comprising:
   a base portion for forming a base of a thermo box, said base portion having a drainage means for draining fluid from the thermo box;
   a plurality of sidewall portions for forming sidewalls of the thermo box; and
   means for connecting said plurality of sidewall portions to said base portion, said means for connecting comprising weakened portions enabling said sidewall portions to be folded relative to said base portion so as to enable the thermo box to be formed.

2. The moulding as set forth in claim 1, wherein:
   said weakened portions of said means for connecting comprise V-shaped grooves in an inner wall of said double walled body extending toward an outer wall of said double walled body.

3. The moulding as set forth in claim 1, wherein:

said double-walled body comprises an inner wall separated from an outer wall by a plurality of distance spacers unitary with said double-walled body.

4. The moulding as set forth in claim 1, wherein said drainage means comprises a plurality of drainage channels in an inner wall of said double-walled body on said base portion and plurality of holes in said inner wall at said drainage channels communicating the exterior of said inner wall at said base portion with the interior of said double-walled hollow body.

5. The moulding as set forth in claim 4, wherein: said holes have inwardly extending flanges extending into said double-walled hollow body.

6. The moulding as set forth in claim 4, wherein: said means for connecting said plurality of sidewall portions to said base portion comprises a plurality of holes communicating the hollow interior of said base portion to the hollow interior of said plurality of sidewall portions for enabling drainage fluid to flo from said base portion to said plurality of sidewall portions.

7. The moulding as set forth in claim 1, wherein: said means for connecting said plurality of sidewall portions to said base portion comprises a plurity of holes communicating the hollow interior of said base portion to the hollow interior of said plurality of sidewall portions for enabling drainage fluid to flow from said base portion to said plurality of sidewall portions.

8. The moulding as set forth in claim 1, and further comprising:
a cover portion for covering the thermo box.

9. The moulding as set forth in claim 8, wherein: said cover portion is a part of said unitary, doublewalled, hollow thermoplastic body, said cover portion connected to one of said plurality of sidewall portions.

10. A thermo box for transporting fresh food, said thermo box comprising:
a thermoplastic, double-walled, hollow base portion;
a plurality of thermoplastic, double-walled, hollow side portions;
a plurality of weakened portions connecting said plurality of side portions to said base portion; and
a plurality of welds connecting each said side portion to an adjacent said side portion.

11. The thermo box as set forth in claim 10, wherein: said base portion is unitary and one-piece with said side portions and said weakened portions.

12. The thermo box as set forth in claim 10, wherein: said base portion comprises means for draining fluid from the interior of said thermo box to the hollow interior of said base portion.

13. The thermo box as set forth in claim 12, wherein: said drainage means comprises a plurality of drainage channels.

14. The thermo box as set forth in claim 13, wherein: said drainage means further comprises a plurality of drainage holes communicating said drainage channels with the interior of said base portion.

15. The thermo box as set forth in claim 12, wherein: said plurality of weakened portions further comprises a plurality of communication holes communication the interior of said base portion with the interior of said side portions to allow drainage fluid to flow between the interior of said base portion and the interior of said side portions.

16. The thermo box as set forth in claim 10, wherein: each said weakened portion comprises an integral extension of an inner wall of said double-walled base portion and an integral extension of an inner wall of a said double-walled side portion connected together and extending obliquely relative to their respective inner walls toward the junction of their respective outer walls.

17. The thermo box as set forth in claim 10, and further comprising:
a thermoplastic, double-walled hollow cover.

18. The thermo box as set forth in claim 17, wherein: said cover is integrally connected to a said side portion.

19. The thermo box as set forth in claim 17, wherein: said double-walled base portion, cover, and side portions have distance spacers for spacing their respective inner and outer walls from each other.

20. The thermo box as set forth in claim 17, wherein: the outer wall of said double-walled base has a plurality of indentations therein; and
the outer wall of said double-walled cover has a plurality of projections thereon corresponding in position and number to said plurality of indentations. d

* * * * *